US008411638B2

(12) United States Patent
Lee et al.

(10) Patent No.: US 8,411,638 B2
(45) Date of Patent: Apr. 2, 2013

(54) METHODS AND SYSTEMS FOR BACKGROUND SCANNING IN OFDMA MOBILE STATIONS

(75) Inventors: Chun Woo Lee, San Ramon, CA (US); Shan Qing, San Diego, CA (US); Tom Chin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 792 days.

(21) Appl. No.: 12/144,586

(22) Filed: Jun. 23, 2008

(65) Prior Publication Data
US 2009/0318154 A1 Dec. 24, 2009

(51) Int. Cl.
H04W 4/00 (2009.01)
(52) U.S. Cl. .................. 370/331; 455/438
(58) Field of Classification Search .......... 455/438
See application file for complete search history.

(56) References Cited

U.S. PATENT DOCUMENTS

| 6,449,290 | B1 * | 9/2002 | Willars et al. ............. 370/507 |
| 6,473,602 | B1 * | 10/2002 | Bottomley ............. 455/226.1 |
| 6,977,918 | B2 * | 12/2005 | Tran et al. ............. 370/349 |
| 7,088,701 | B1 * | 8/2006 | Attar et al. ............. 370/347 |
| 7,130,660 | B2 * | 10/2006 | Jindal ............. 455/561 |
| 7,792,526 | B2 * | 9/2010 | Salomone ............. 455/434 |
| 2005/0014501 | A1 | 1/2005 | Aitkenhead et al. |
| 2006/0171304 | A1 * | 8/2006 | Hill et al. ............. 370/228 |
| 2007/0060125 | A1 * | 3/2007 | Rahim ............. 455/436 |
| 2007/0123254 | A1 * | 5/2007 | Choi et al. ............. 455/434 |
| 2008/0229050 | A1 * | 9/2008 | Tillgren ............. 711/200 |
| 2009/0154426 | A1 * | 6/2009 | Perraud et al. ............. 370/332 |
| 2009/0156210 | A1 * | 6/2009 | Ponce De Leon et al. .... 455/436 |
| 2010/0029276 | A1 * | 2/2010 | Hwang ............. 455/436 |
| 2010/0226412 | A1 * | 9/2010 | Weir ............. 375/130 |

FOREIGN PATENT DOCUMENTS

| EP | 1010345 | | 6/2000 |
| EP | 1415486 A1 | | 5/2004 |
| GB | 2378092 A | | 1/2003 |

(Continued)

OTHER PUBLICATIONS

International Search Report—PCT/US2009/048066, International Searching Authority—European Patent Office, Oct. 21, 2009.

(Continued)

*Primary Examiner* — Brandon Renner
*Assistant Examiner* — Faisal Choudhury
(74) *Attorney, Agent, or Firm* — Charles Chesney

(57) ABSTRACT

Certain embodiments provide techniques for background scanning in a wireless communication device receiving signals from multiple base stations using a background scanning processor separate from a receive processor. The techniques generally include buffering raw signal data from multiple base stations, forwarding the raw signal data to a receive baseband processor for decoding data from a first one of the base stations that is currently designated as a serving base station with an active connection to the wireless communications device, forwarding the raw signal data to a background scanning processor, separate from the receive baseband processor, and generating channel characteristics corresponding to the multiple base stations with the background scanning processor without interrupting the exchange of data with the first base station designated as the serving base station.

17 Claims, 10 Drawing Sheets

FOREIGN PATENT DOCUMENTS

| | | |
|---|---|---|
| GB | 2437348 | 10/2007 |
| JP | 09101931 | 4/1997 |
| JP | 2001503229 A | 3/2001 |
| JP | 2006148836 A | 6/2006 |
| JP | 2006319520 A | 11/2006 |
| JP | 2007312171 A | 11/2007 |
| RU | 2308806 C2 | 10/2007 |
| TW | 511349 B | 11/2002 |
| WO | WO03013163 A1 | 2/2003 |
| WO | WO2007024346 | 3/2007 |

OTHER PUBLICATIONS

IEEE P802.16e/D12, Part 16: Air Interface for Fixed and Mobile Broadband Wireless Access Systems, Amendment for Physical and Medium Access Control Layers for Combined Fixed and Mobile Operation in Licensed Bands, Section 8.4.1-8.4.4; 6.3.9-6.3.10; and 6.3.22, Oct. 2005.

Taiwan Search Report—TW098121034—TIPO—Aug. 28, 2012.

Taiwan Search Report—TW98121034—TIPO—Dec. 4, 2012.

\* cited by examiner

METHODS AND SYSTEMS FOR BACKGROUND SCANNING IN OFDMA MOBILE STATIONS

TECHNICAL FIELD

Certain embodiments of the present disclosure generally relate to wireless communication and, more particularly, to background scanning of base stations by a mobile communications device.

BACKGROUND

OFDM and OFDMA wireless communication systems under IEEE 802.16 use a network of base stations to communicate with wireless devices (i.e., mobile stations) registered for services in the systems based on the orthogonality of frequencies of multiple subcarriers and can be implemented to achieve a number of technical advantages for wideband wireless communications, such as resistance to multipath fading and interference. Each base station (BS) emits and receives radio frequency (RF) signals that convey data to and from the mobile stations (MS). Such an RF signal from a BS includes an overhead load, in addition to the data load (voice and other data), for various communication management functions. Each MS processes the information in the overhead load of each received signal prior to processing the data.

Under the current versions of the IEEE 802.16 standard for the OFDMA systems, every downlink subframe from a base station includes a preamble and a frame control header (FCH) following the preamble as part of the overhead load. The preamble includes information for searching a cell and a cell sector within a cell and for synchronizing a mobile station in both time and frequency with the received downlink signal. The FCH portion of the downlink subframe includes information on the downlink transmission format (e.g., the downlink media access protocol, or DL MAP) and control information for the downlink data reception (e.g., allocation of the subcarriers in the current downlink frame). Therefore, a receiver, such as a MS, first decodes the FCH to determine the position of the DL MAP, decodes the DL MAP of the corresponding position, and then extracts the data.

If the communication quality falls below a certain threshold, a MS may start scanning for another BS with which to execute a hand-over (HO). However, under the 802.16e standard, a MS should stop transmission and reception of data to scan neighboring base stations. Accordingly, to scan for another BS, a MS may request a serving BS to allocate time intervals during which the MS may scan neighboring BSs. A MS may scan neighboring BSs by sending a MOB_SCN-REQ message in which requested scan duration, interleaving interval, and scan information may be included.

A serving BS that has received a MOB_SCN-REQ may grant time intervals to the MS by sending a MOB_SCN-REP message which may include a scanning start frame and the values granted. Additionally, the BS may send unsolicited MOB_SCN-RSP messages to trigger the MS to begin neighbor BS scanning.

Neighbor BS scanning is an essential function for a MS to effectuate a proper HO. It is evident that more frequent scanning of BS will improve HO performance. However, under the 802.16e standard, a MS should stop transmission and reception of data to scan neighbor base stations, meaning the BS should not send data to the MS during a scanning interval and the BS is not responsible for receiving data from the MS during a scanning interval.

SUMMARY

Certain embodiments provide a method for background scanning in a wireless communication device receiving signals from multiple base stations. The method generally includes buffering raw signal data from multiple base stations, forwarding the raw signal data to a receive baseband processor for decoding data from a first one of the base stations that is currently designated as a serving base station with an active connection to the wireless communications device, forwarding the raw signal data to a background scanning processor, separate from the receive baseband processor, and generating channel characteristics corresponding to the multiple base stations with the background scanning processor without interrupting the exchange of data with the first base station designated as the serving base station.

Certain embodiments provide a wireless communications device. The device generally includes logic for buffering raw signal data received from multiple base stations, a receive baseband processor for decoding, from the raw signal data, data from a first one of the base stations that is currently designated as a serving base station with an active connection to the wireless communications device, and a background scanning processor for generating channel characteristics corresponding to the multiple base stations without interrupting the exchange of data with the first base station designated as the serving base station.

Certain embodiments provide an apparatus for wireless communications. The apparatus generally includes means for buffering raw signal data received from multiple base stations, means for decoding, from the raw signal data, data from a first one of the base stations that is currently designated as a serving base station with an active connection to the wireless communications device, and means for generating, based on the raw signal data, channel characteristics corresponding to the multiple base stations without interrupting the exchange of data with the first base station designated as the serving base station.

Certain embodiments provide a computer-readable medium containing a program for background scanning in a wireless communication device receiving signals from multiple base stations. When executed by a processor, the program performs operations generally including receiving raw signal data from multiple base stations, and generating channel characteristics corresponding to the multiple base stations without interrupting the exchange of data between the wireless communications device and a first one of the base stations designated as a serving base station.

BRIEF DESCRIPTION OF THE DRAWINGS

So that the manner in which the above recited features of the present disclosure can be understood in detail, a more particular description, briefly summarized above, may be had by reference to embodiments, some of which are illustrated in the appended drawings. It is to be noted, however, that the appended drawings illustrate only certain typical embodiments of this disclosure and are therefore not to be considered limiting of its scope, for the description may admit to other equally effective embodiments.

DETAILED DESCRIPTION

Embodiments of the present disclosure enable a MS to perform background (BKG) scanning of neighboring BSs without stopping data exchange with a serving BS. The implementation of BKG scanning may eliminate the trade-off between HO performance and data throughput performance.
Exemplary Wireless Communication System The methods and apparatus of the present disclosure may be utilized in a broadband wireless communication system. As used herein, the term "broadband wireless" generally refers to technology that may provide any combination of wireless services, such as voice, Internet and/or data network access over a given area.

WiMAX, which stands for the Worldwide Interoperability for Microwave Access, is a standards-based broadband wireless technology that provides high-throughput broadband connections over long distances. There are two main applications of WiMAX today: fixed WiMAX and mobile WiMAX. Fixed WiMAX applications are point-to-multipoint, enabling broadband access to homes and businesses, for example. Mobile WiMAX offers the full mobility of cellular networks at broadband speeds.

Mobile WiMAX is based on OFDM (orthogonal frequency-division multiplexing) and OFDMA (orthogonal frequency division multiple access) technology. OFDM is a digital multi-carrier modulation technique that has recently found wide adoption in a variety of high-data-rate communication systems. With OFDM, a transmit bit stream is divided into multiple lower-rate substreams. Each substream is modulated with one of multiple orthogonal subcarriers and sent over one of a plurality of parallel subchannels. OFDMA is a multiple access technique in which users are assigned subcarriers in different time slots. OFDMA is a flexible multiple-access technique that can accommodate many users with widely varying applications, data rates, and quality of service requirements.

The rapid growth in wireless internets and communications has led to an increasing demand for high data rate in the field of wireless communications services. OFDM/OFDMA systems are today regarded as one of the most promising research areas and as a key technology for the next generation of wireless communications. This is due to the fact that OFDM/OFDMA modulation schemes can provide many advantages such as modulation efficiency, spectrum efficiency, flexibility and strong multipath immunity over conventional single carrier modulation schemes.

IEEE 802.16x is an emerging standard organization to define an air interface for fixed and mobile broadband wireless access (BWA) systems. These standards define at least four different physical layers (PHYs) and one media access control (MAC) layer. The OFDM and OFDMA physical layer of the four physical layers are the most popular in the fixed and mobile BWA areas respectively.

Figure 1:
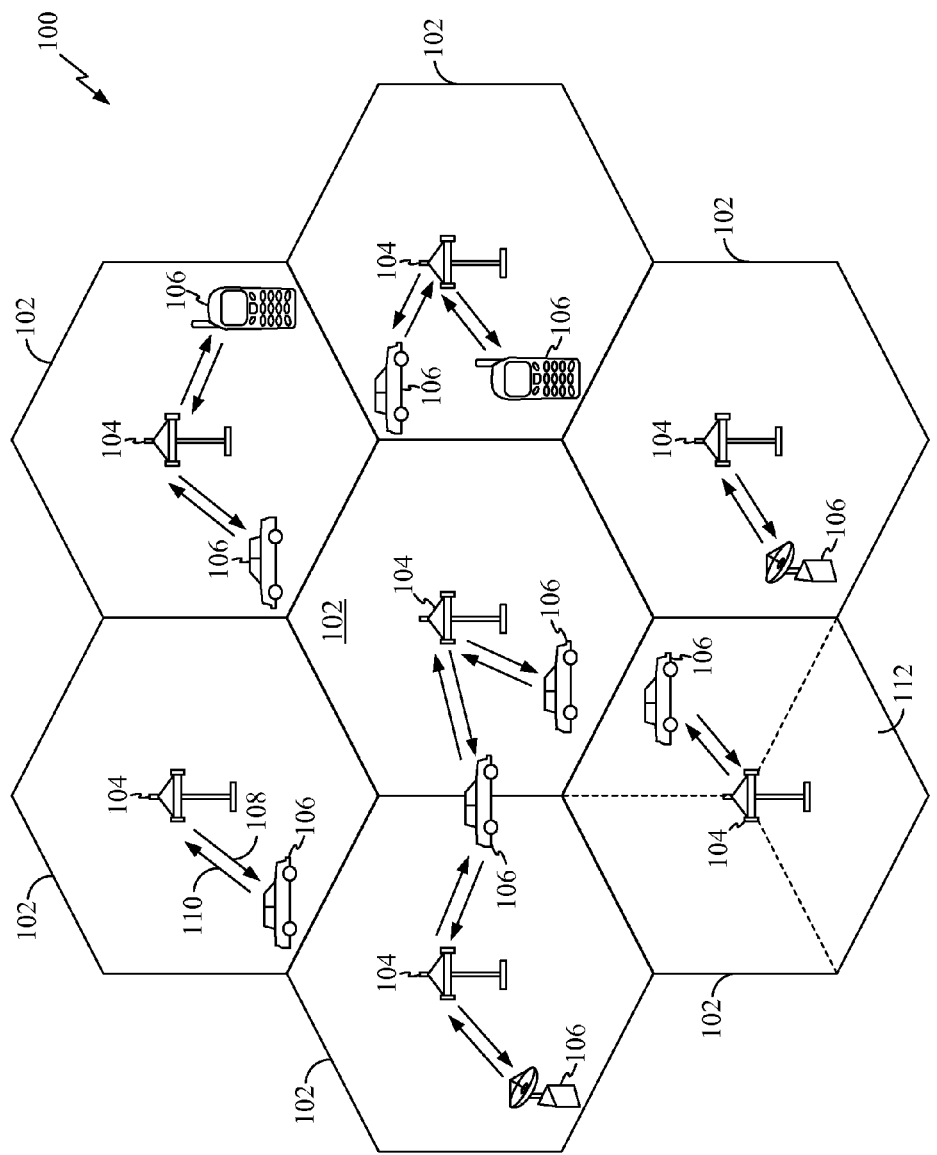
FIG. 1 illustrates an example wireless communication system, in accordance with certain embodiments of the present disclosure.

FIG. 1 illustrates an example of a wireless communication system 100 in which embodiments of the present disclosure may be employed. The wireless communication system 100 may be a broadband wireless communication system. The wireless communication system 100 may provide communication for a number of cells 102, each of which is serviced by a base station 104. A base station 104 may be a fixed station that communicates with user terminals 106. The base station 104 may alternatively be referred to as an access point, a Node B or some other terminology.

FIG. 1 depicts various user terminals 106 dispersed throughout the system 100. The user terminals 106 may be fixed (i.e., stationary) or mobile. The user terminals 106 may alternatively be referred to as remote stations, access terminals, terminals, subscriber units, mobile stations, stations, user equipment, etc. The user terminals 106 may be wireless devices, such as cellular phones, personal digital assistants (PDAs), handheld devices, wireless modems, laptop computers, personal computers, etc.

A variety of algorithms and methods may be used for transmissions in the wireless communication system 100 between the base stations 104 and the user terminals 106. For example, signals may be sent and received between the base stations 104 and the user terminals 106 in accordance with OFDM/OFDMA techniques. If this is the case, the wireless communication system 100 may be referred to as an OFDM/OFDMA system.

A communication link that facilitates transmission from a base station 104 to a user terminal 106 may be referred to as a downlink 108, and a communication link that facilitates transmission from a user terminal 106 to a base station 104 may be referred to as an uplink 110. Alternatively, a downlink 108 may be referred to as a forward link or a forward channel, and an uplink 110 may be referred to as a reverse link or a reverse channel.

A cell 102 may be divided into multiple sectors 112. A sector 112 is a physical coverage area within a cell 102. Base stations 104 within a wireless communication system 100 may utilize antennas that concentrate the flow of power within a particular sector 112 of the cell 102. Such antennas may be referred to as directional antennas.

Figure 2:
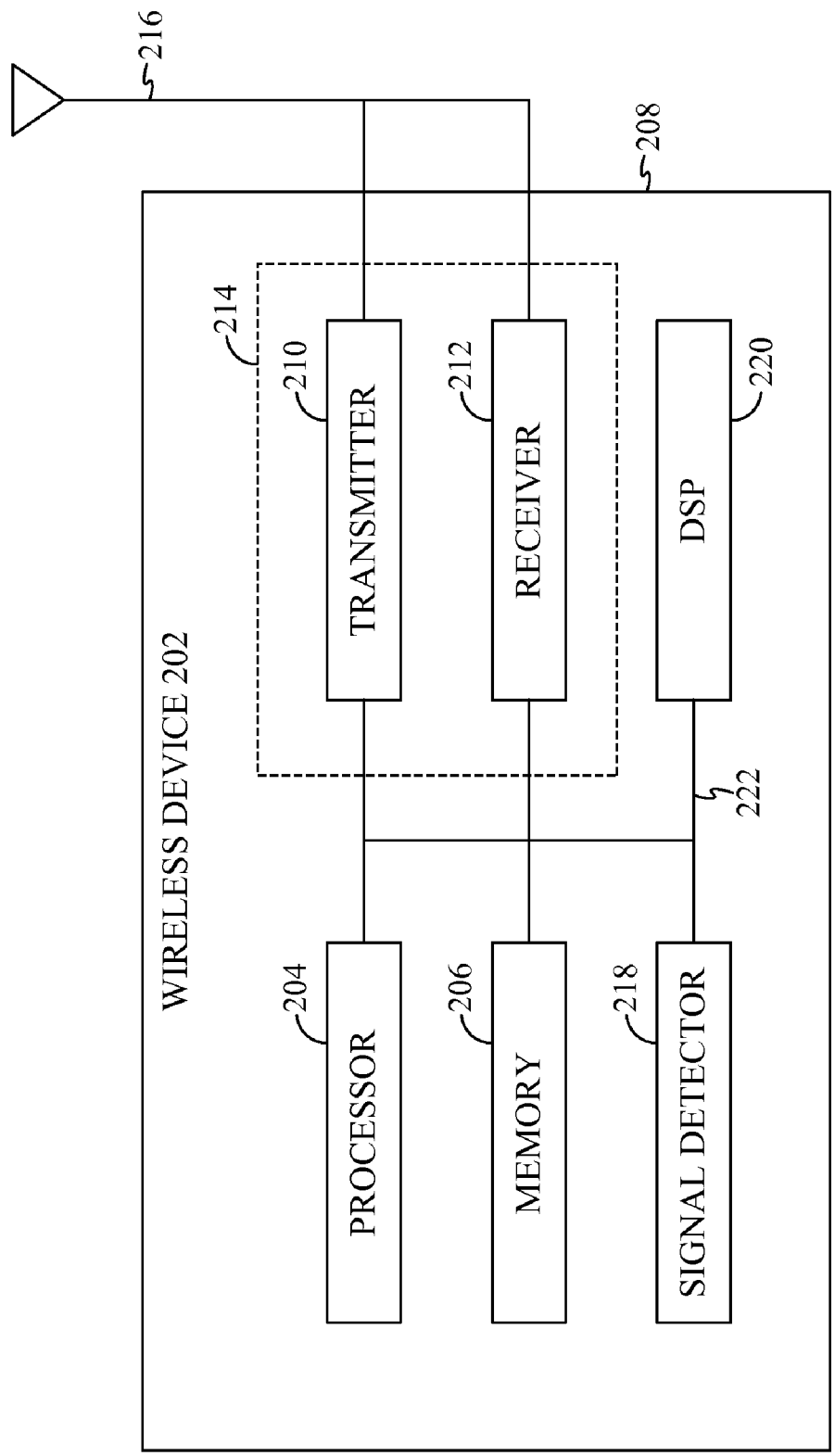
FIG. 2 illustrates various components that may be utilized in a wireless device in accordance with certain embodiments of the present disclosure.

FIG. 2 illustrates various components that may be utilized in a wireless device 202 that may be employed within the wireless communication system 100. The wireless device 202 is an example of a device that may be configured to implement the various methods described herein. The wireless device 202 may be a base station 104 or a user terminal 106.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The wireless device 202 may also include a housing 208 that may include a transmitter 210 and a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The wireless device 202 may also include a signal detector 218 that may be used in an effort to detect and quantify the level of signals received by the transceiver 214. The signal detector 218 may detect such signals as total energy, pilot energy from pilot sub-carriers or signal energy from preamble symbol, power spectral density and other signals. The wireless device 202 may also include a digital signal processor (DSP) 220 for use in processing signals.

The various components of the wireless device 202 may be coupled together by a bus system 222, which may include a power bus, a control signal bus, and a status signal bus in addition to a data bus.

Figure 3:
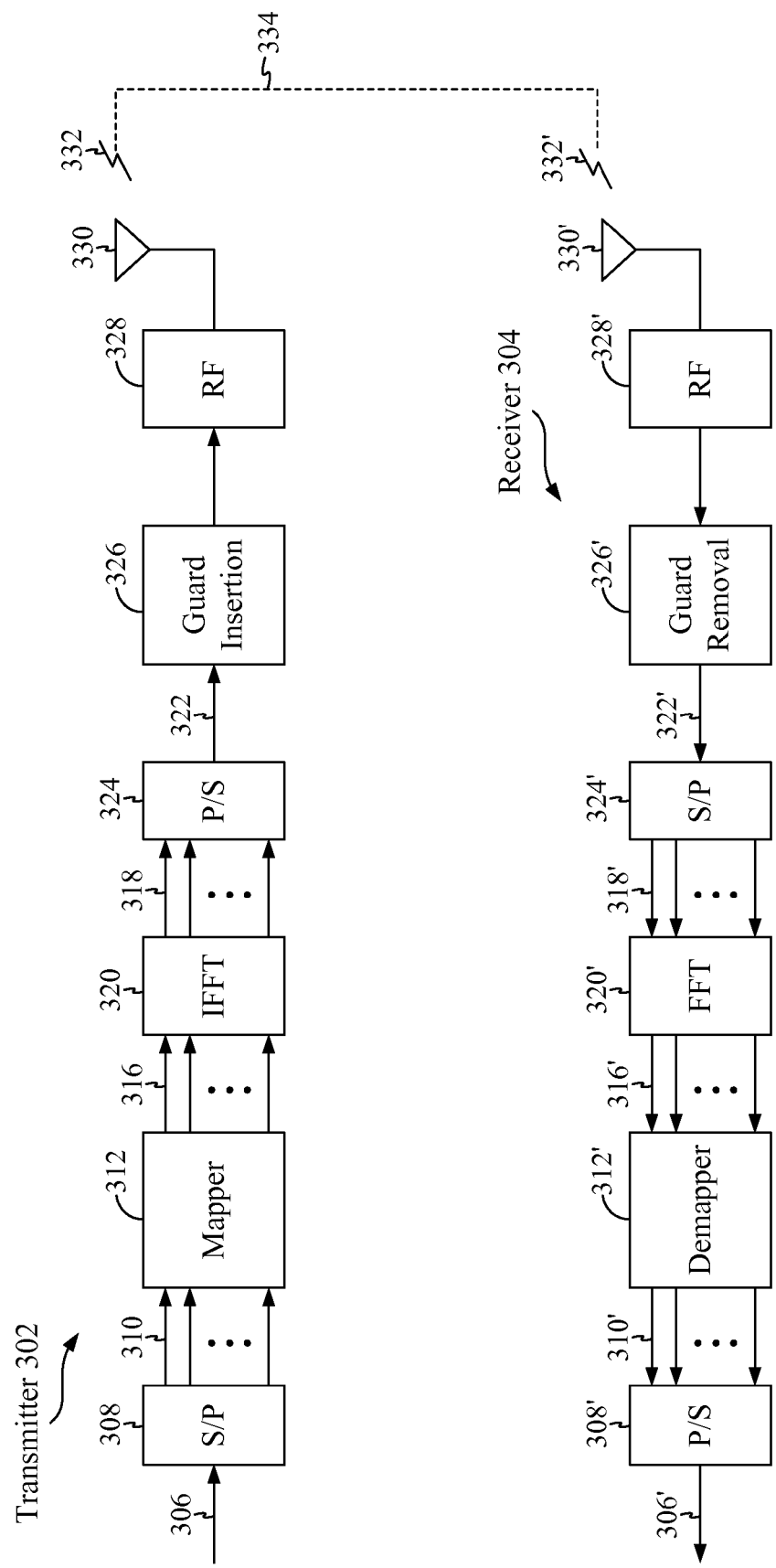
FIG. 3 illustrates an example transmitter and an example receiver that may be used within a wireless communication system that utilizes orthogonal frequency-division multiplexing and orthogonal frequency division multiple access (OFDM/OFDMA) technology in accordance with certain embodiments of the present disclosure.

FIG. 3 illustrates an example of a transmitter 302 that may be used within a wireless communication system 100 that utilizes OFDM/OFDMA. Portions of the transmitter 302 may be implemented in the transmitter 210 of a wireless device 202. The transmitter 302 may be implemented in a base station 104 for transmitting data 306 to a user terminal 106 on a downlink 108. The transmitter 302 may also be implemented in a user terminal 106 for transmitting data 306 to a base station 104 on an uplink 110.

Data 306 to be transmitted is shown being provided as input to a serial-to-parallel (S/P) converter 308. The S/P converter 308 may split the transmission data into N parallel data streams 310.

The N parallel data streams 310 may then be provided as input to a mapper 312. The mapper 312 may map the N parallel data streams 310 onto N constellation points. The mapping may be done using some modulation constellation, such as binary phase-shift keying (BPSK), quadrature phase-shift keying (QPSK), 8 phase-shift keying (8PSK), quadrature amplitude modulation (QAM), etc. Thus, the mapper 312 may output N parallel symbol streams 316, each symbol stream 316 corresponding to one of the N orthogonal subcarriers of the inverse fast Fourier transform (IFFT) 320. These N parallel symbol streams 316 are represented in the frequency domain and may be converted into N parallel time domain sample streams 318 by an IFFT component 320.

A brief note about terminology will now be provided. N parallel modulations in the frequency domain are equal to N modulation symbols in the frequency domain, which are equal to N mapping and N-point IFFT in the frequency domain, which is equal to one (useful) OFDM symbol in the time domain, which is equal to N samples in the time domain. One OFDM symbol in the time domain, $N_s$, is equal to $N_{cp}$ (the number of guard samples per OFDM symbol)+N (the number of useful samples per OFDM symbol).

The N parallel time domain sample streams 318 may be converted into an OFDM/OFDMA symbol stream 322 by a parallel-to-serial (P/S) converter 324. A guard insertion component 326 may insert a guard interval between successive OFDM/OFDMA symbols in the OFDM/OFDMA symbol stream 322. The output of the guard insertion component 326 may then be upconverted to a desired transmit frequency band by a radio frequency (RF) front end 328. An antenna 330 may then transmit the resulting signal 332.

FIG. 3 also illustrates an example of a receiver 304 that may be used within a wireless device 202 that utilizes OFDM/OFDMA. Portions of the receiver 304 may be implemented in the receiver 212 of a wireless device 202. The receiver 304 may be implemented in a user terminal 106 for receiving data 306 from a base station 104 on a downlink 108. The receiver 304 may also be implemented in a base station 104 for receiving data 306 from a user terminal 106 on an uplink 110.

The transmitted signal 332 is shown traveling over a wireless channel 334. When a signal 332' is received by an antenna 330', the received signal 332' may be downconverted to a baseband signal by an RF front end 328'. A guard removal component 326' may then remove the guard interval that was inserted between OFDM/OFDMA symbols by the guard insertion component 326.

The output of the guard removal component 326' may be provided to an S/P converter 324'. The S/P converter 324' may divide the OFDM/OFDMA symbol stream 322' into the N parallel time-domain symbol streams 318', each of which corresponds to one of the N orthogonal subcarriers. A fast Fourier transform (FFT) component 320' may convert the N parallel time-domain symbol streams 318' into the frequency domain and output N parallel frequency-domain symbol streams 316'.

A demapper 312' may perform the inverse of the symbol mapping operation that was performed by the mapper 312 thereby outputting N parallel data streams 310'. A P/S converter 308' may combine the N parallel data streams 310' into a single data stream 306'. Ideally, this data stream 306' corresponds to the data 306 that was provided as input to the transmitter 302. Note that elements 308', 310', 312', 316', 320', 318' and 324' may all be found on a in a baseband processor 340'.

Neighbor Base Station Scanning

As a MS moves within a cell, or between cells, the characteristics of one or more of the signals received by the MS may change. Since the data being received is not bound to a specific BS, the MS may utilize a handoff mechanism that determines the ideal BS with which to communicate.

In accordance with the 802.16e standard, a conventional MS may request a scanning period from the serving BS to decode and evaluate the channel characteristics of signals from neighboring BSs. A conventional MS will typically cease data transmission and reception during the scanning period, thereby reducing overall throughput. Consequently, a trade-off may develop between ensuring high signal quality by performing neighboring BS scanning to properly effectuate handoffs and maintaining data throughput performance. In other words, more frequent scanning of neighboring BSs will improve HO performance and signal quality, but performing the scanning and associated HO operations may significantly hinder the data throughput.

Embodiments of the present disclosure, however, provide a receiver architecture that may allow background scanning to be performed with a reduced impact on data throughput. The background scanning may be performed in accordance with the operations 400 shown in FIG. 4 utilizing the architecture. As illustrated in FIG. 5, the architecture may include a separate baseband processor for background scanning, in addition to a receiver baseband processing. By "offloading" scanning operations to this separate processor, a connection with a serving base station may be maintained while scanning neighboring base stations.

Figure 4:
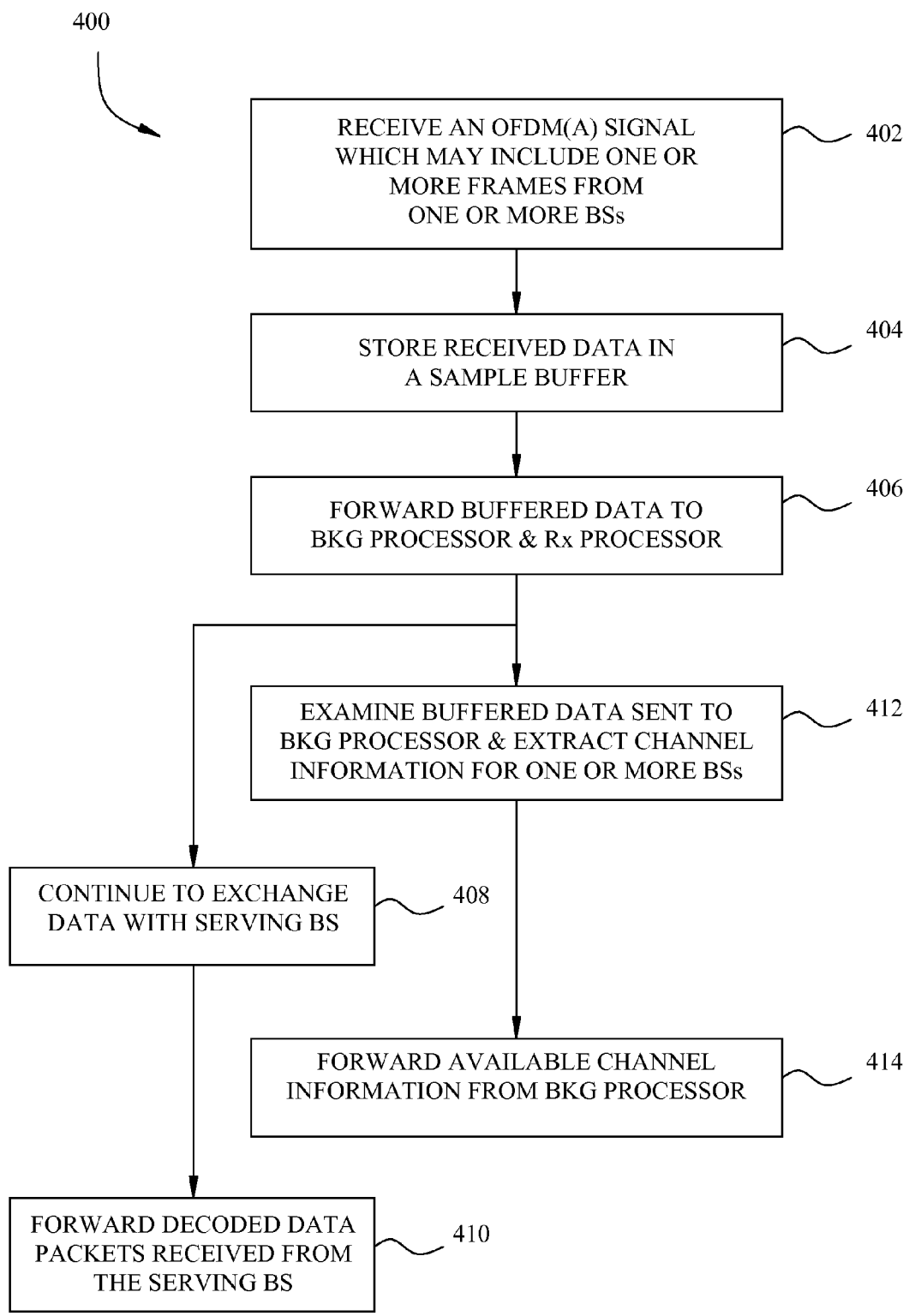
FIG. 4 illustrates example operations of a MS that may maintain data throughput while performing neighboring BS scanning, in accordance with embodiments of the present disclosure.
Figure 5:
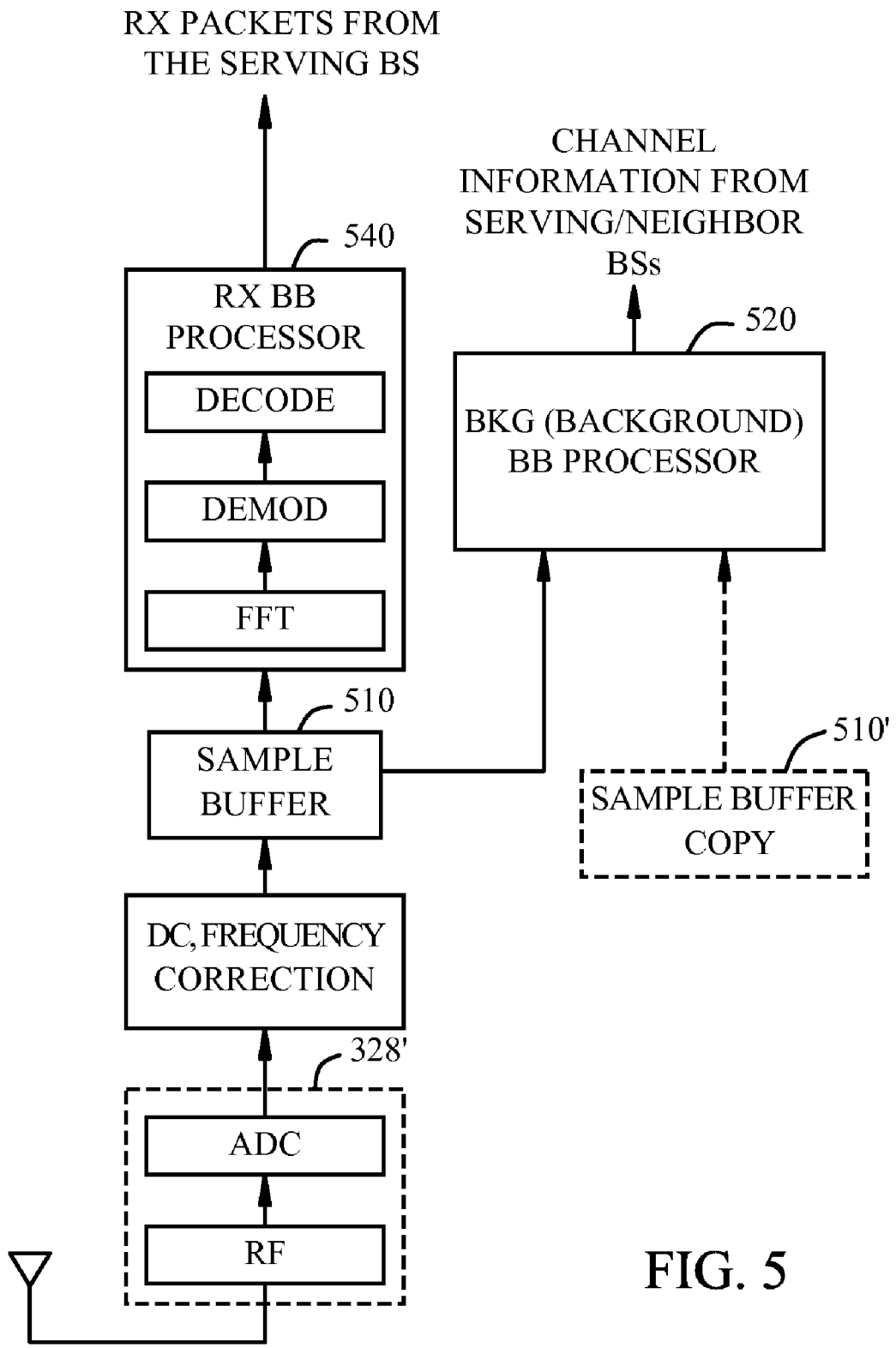
FIG. 5 illustrates an example MS with a BKG processor, in accordance with embodiments of the present disclosure.

Referring to FIG. 4, the example operations 400 for background scanning that may be performed by an MS with a separate baseband processor will be described. The operations may help maintain data throughput while performing neighboring BS scanning. The operations 400 may be described with reference to components found in FIG. 5.

The operations begin, at 402, with an MS receiving OFDM (A) transmission signals from multiple base stations. The transmission signals may correspond to one or more frames of data and, thus, may include a frame control header (FCH) and corresponding data bursts. As illustrated, the architecture may utilize a conventional RF front end 328' to downconvert the received signal to a baseband signal and then remove the accompanying guard interval.

At 404, raw data received by the MS, which may include all "over the air" information captured by the receiver, is stored in a sample buffer. For example, the architecture may include a sample buffer 510 that may be any suitable type buffer, such as an in-phaser, quadrature-phaser (IQ) or intermediate frequency (IF) sample buffer which may be accessed from multiple decoder blocks.

At 406, the stored data may then be forwarded to a conventional reception (Rx) baseband processor 540, as well as a background (BKG) processor 520. Utilizing the sample buffer 510 and separate baseband processor 520, a connection with the serving base station may be maintained, allowing the exchange of data while performing background scanning operations in parallel.

At 408, the MS continues to exchange data with a serving BS, using the RX processor 540 to process the received signal. After decoding the stored data, at 410, the Rx processor 540 may forward data packet received from the serving BS to additional logic or applications downstream. The exchange of data between the BS and the MS may require the RX processor 540 to perform one or more conventional processing functions (e.g., fast Fourier transforms (FFT), demodulation and decoding). Note that conventional processing functions typically filter out a majority of the information from neighboring (non-serving) BSs in an effort to improve Rx performance.

As data is being exchanged with the RX processor 540, at 412, BKG processor 520 may process the raw buffered data to generate and/or extract channel information for the serving base station and one or more neighboring BSs may be extracted. The BKG processor 520 may perform any suitable operations to process the buffered data and generate information useful in performing a handoff between base stations.

For example, the BKG processor 520 may measure the received signal strength indicator (RSSI), the carrier-to-interference plus noise ratio (CINR), and any suitable type measurements that may prove useful for characterizing each segment of the RF sub-carriers while the Rx processor 540 is decoding the data received from the serving BS.

The BKG processor 520 may then send the channel characteristics for the various BSs being monitored to additional logic (e.g., the HO mechanism) for additional processing. For some embodiments, the HO mechanism may use the channel information forwarded from the BKG processor 520 to determine the preferred BS to use as a serving BS with which to exchange data.

Because the sample buffer 510 includes all the information received by the MS, the BKG processor 520 may examine the buffered raw data and extract any information deemed necessary. In fact, the BKG processor 520 may perform any required processing with the exclusion of decoding the data received from the serving BS, which is performed by the Rx processor 540.

For example, in some embodiments the BKG processor 520 may contain the necessary logic to act as the HO mechanism. In other words, the BKG processor 520 may also evaluate the channel information from the serving and neighboring BSs, determine if a HO is desirable, and, if so, effectuate a HO. In other embodiments, the BKG processor 520 may update an HO trigger metric table to reflect the channel characteristic information. The HO trigger metric table may be used by a separate HO mechanism to determine if a HO is desirable, and, if so, effectuate a HO. The HO mechanism may evaluate characteristics (e.g., CINR, RSSI, and bit error rates) of the various signals and determine when the MS should effectuate a HO.

If the BKG processor 520 is too slow or if there is too much information to process before the arrival of a subsequent frame, an additional sample buffer 510' may be employed to hold a copy of the received data for one or more additional frames. In such embodiments, source selection logic may also be employed for use with the BKG processor 520.

Figure 6A:
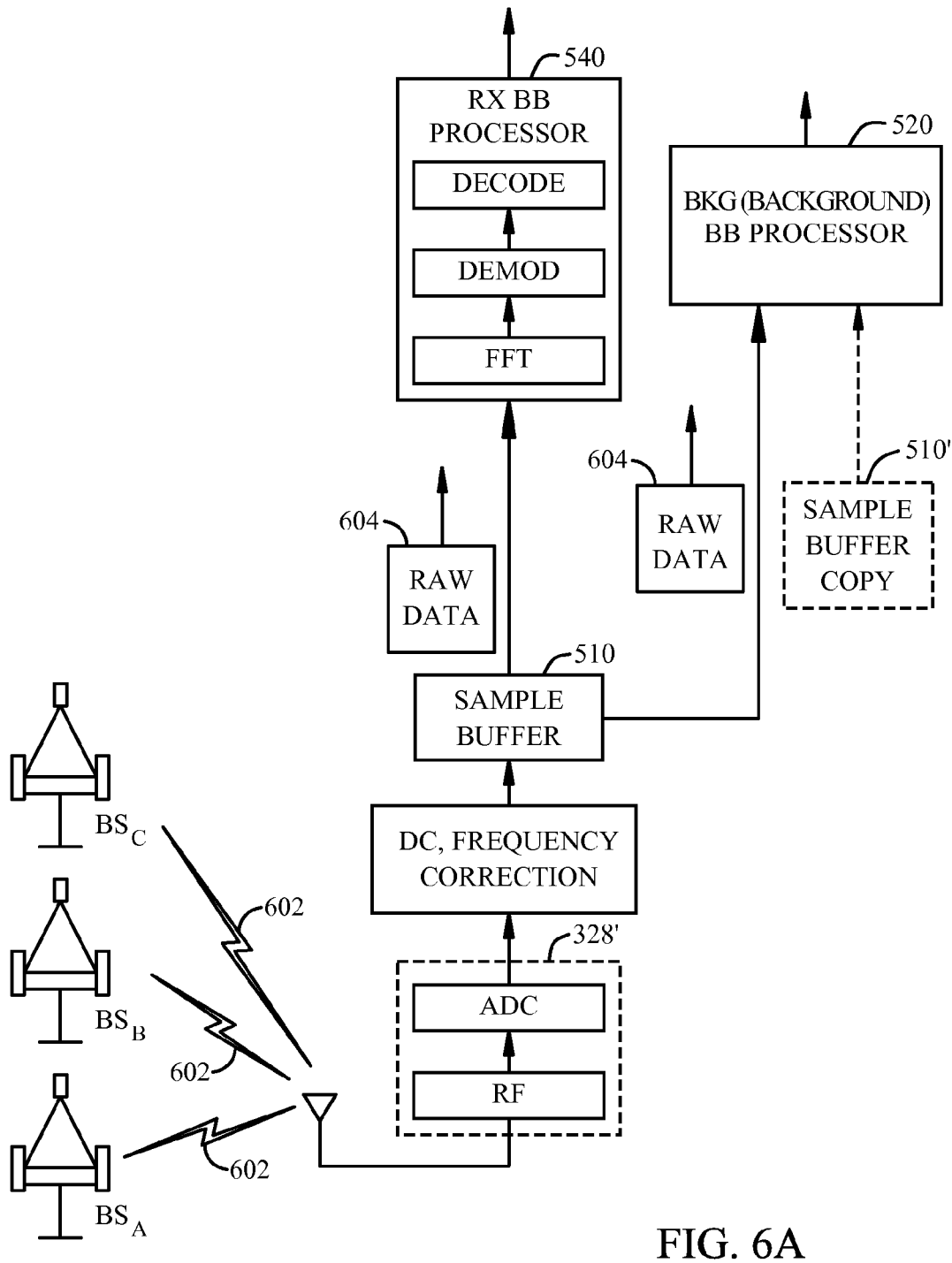
FIGS. 6A-6D illustrate a block diagram of example operations, in accordance with embodiments of the present disclosure.
Figure 6B:
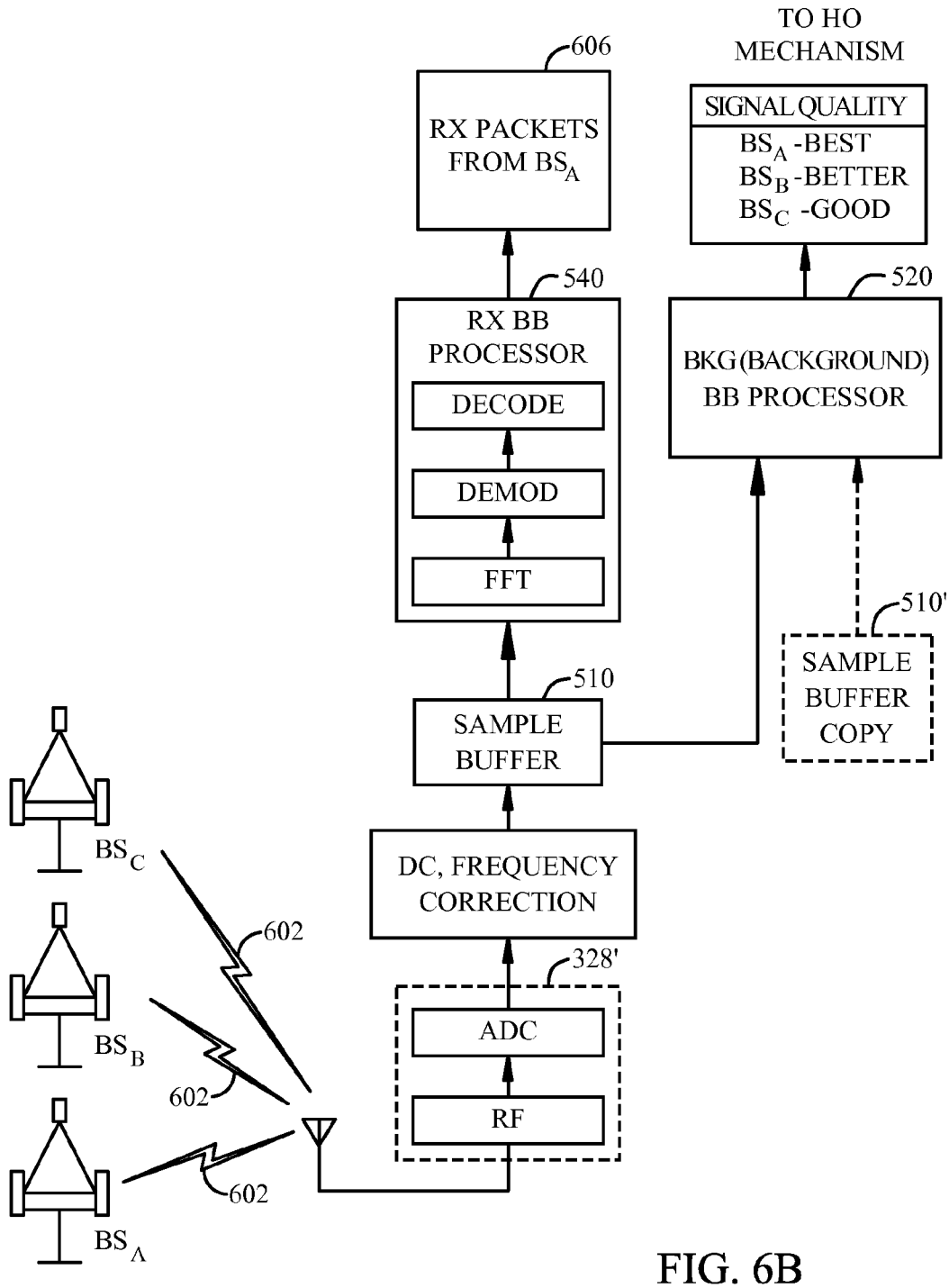
Figure 6C:
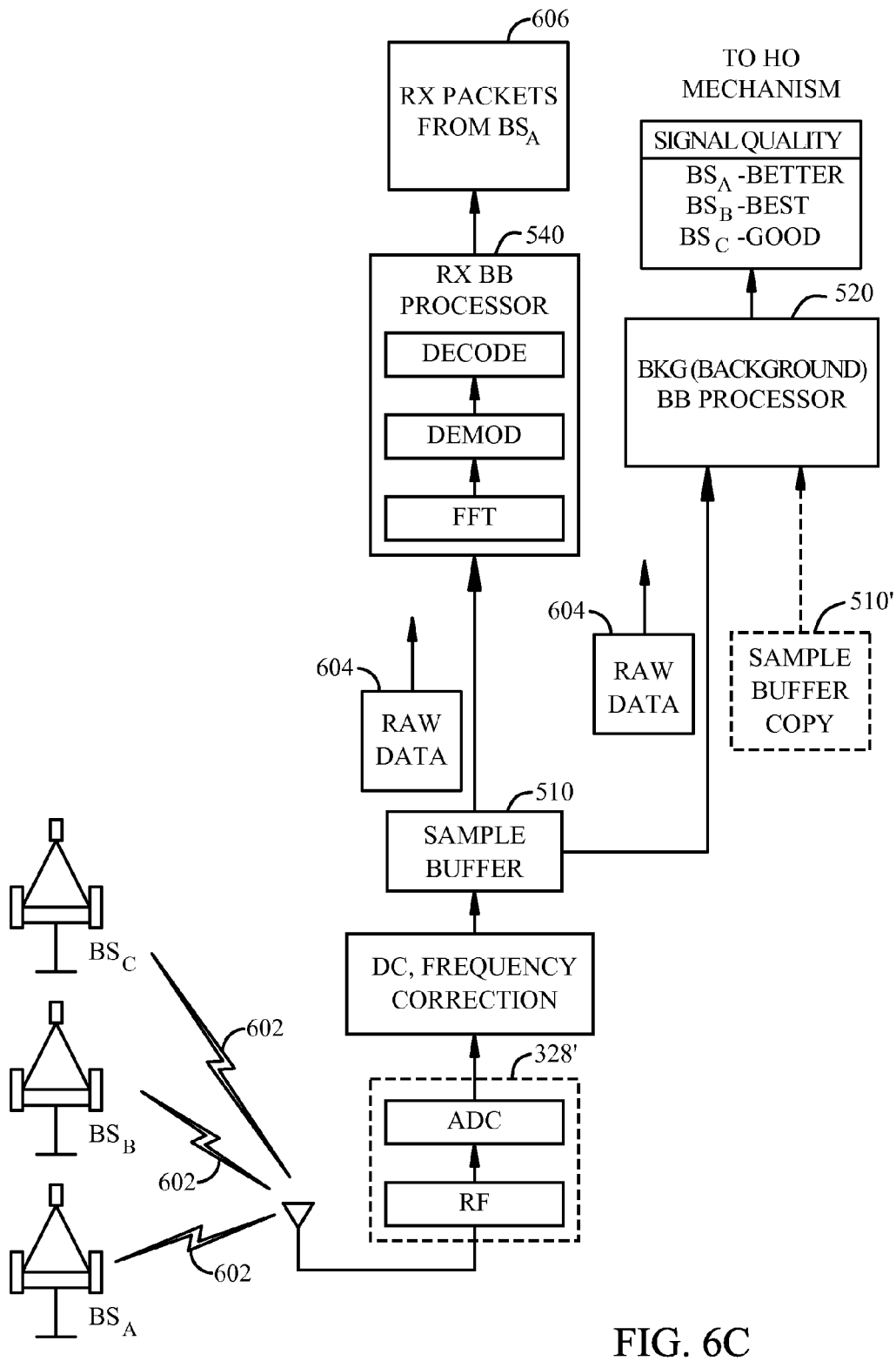

FIGS. 6A-6C illustrate the parallel processing flow that may be performed by the architecture shown in FIG. 5 to when background scanning using the BKG baseband processor 520. The Figures assume an initial serving Base Station ($BS_A$) and two neighboring Base Stations ($BS_B$ and $BS_C$) and that $BS_A$ initially has the best signal quality of the three.

As illustrated in FIG. 6A, signals from all three BSs are received by the MS. The sample buffer 510 may be used to store all the "raw data" information 604 received by the MS, which may then be forwarded in parallel to the RX processor 540 and the BKG processor 520. Because $BS_A$ is the serving station, RX BB Processor 540 will filter out data from the other base stations, and decode the data received from $BS_A$. BKG processor 520, on the other hand, will perform background scanning by processing data from all three base stations to generate corresponding channel condition information that may be used to affect a handoff.

As illustrated in FIG. 6B, as long as the BKG processor indicates channel conditions for $BS_A$ are better than channel conditions for $BS_B$ and $BS_C$, $BS_A$ will remain the serving station. Thus, as illustrated Rx processor 540 will continue to process data from $BS_A$ and forward data packets 606 from $BS_A$ to additional logic or applications downstream. In the present example, the initial serving BS is $BS_A$. $BS_A$ may be selected as the initial serving BS based on default settings of the MS, by signal analysis during the BS/MS registration process, or any other suitable technique.

As channel conditions change, for example, due to movement by the mobile station, BKG processor 520 will continue to process raw data 604 received from multiple base stations to determine updated channel conditions in the background. At some point, BKG processor 520 may evaluate the channel information from the serving and neighboring BSs and determine that channel conditions for a neighboring station are better than for a current serving station. For some embodiments, BKG processor 520 may update HO trigger metric tables used by a separate HO mechanism to determine if a HO is desirable.

As illustrated in FIG. 6C, the BKG processor 520 may determine that channel conditions for a neighboring station $BS_B$ are better than the current serving station $BS_B$ and may update channel information to inform the HO mechanism accordingly. Until the HO mechanism affects the handoff and communicates to the RX processor 540, however, the RX processor 540 may continue to process data from $BS_A$.

Figure 6D:
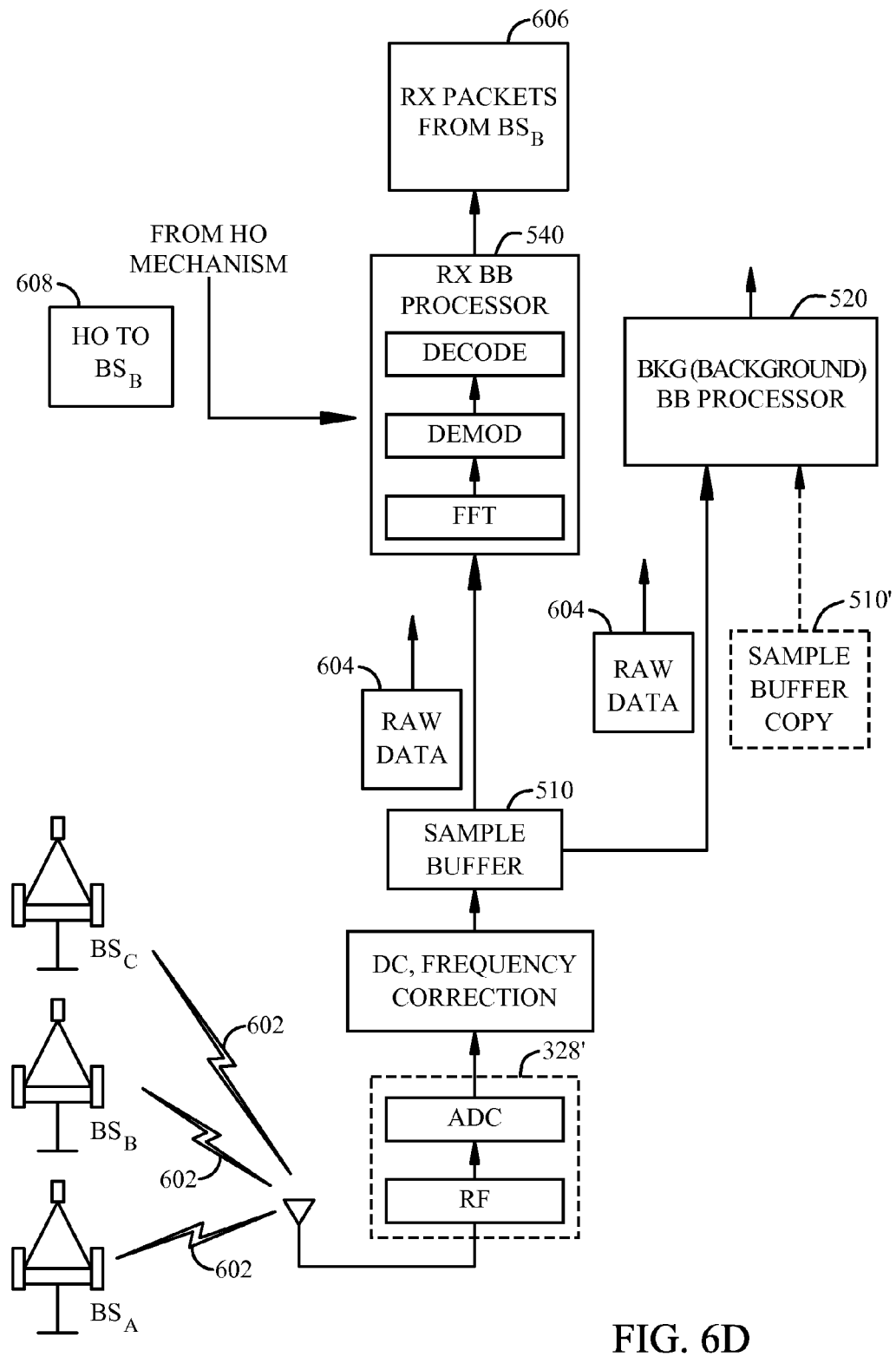

As illustrated in FIG. 6D, however, after the HO mechanism processes the updated channel information that indicates better channel conditions for $BS_B$, the HO mechanism may signal the RX processor 540 to affect a handoff (e.g., via a message/signal 608). Thus, after the HO has been performed to switch to $BS_B$ as the serving station Rx processor 540 begins to filter out data from neighboring stations $BS_A$ and $BS_C$. RX processor 540 will process data from new serving station $BS_B$ and forward the data packets 606 from BS$_B$ to additional logic or applications downstream. The handoff procedure described herein may take place, for example, when a user terminal 106 moves across boundaries of cells 102 serviced by different base stations 104.

Figure 4A:
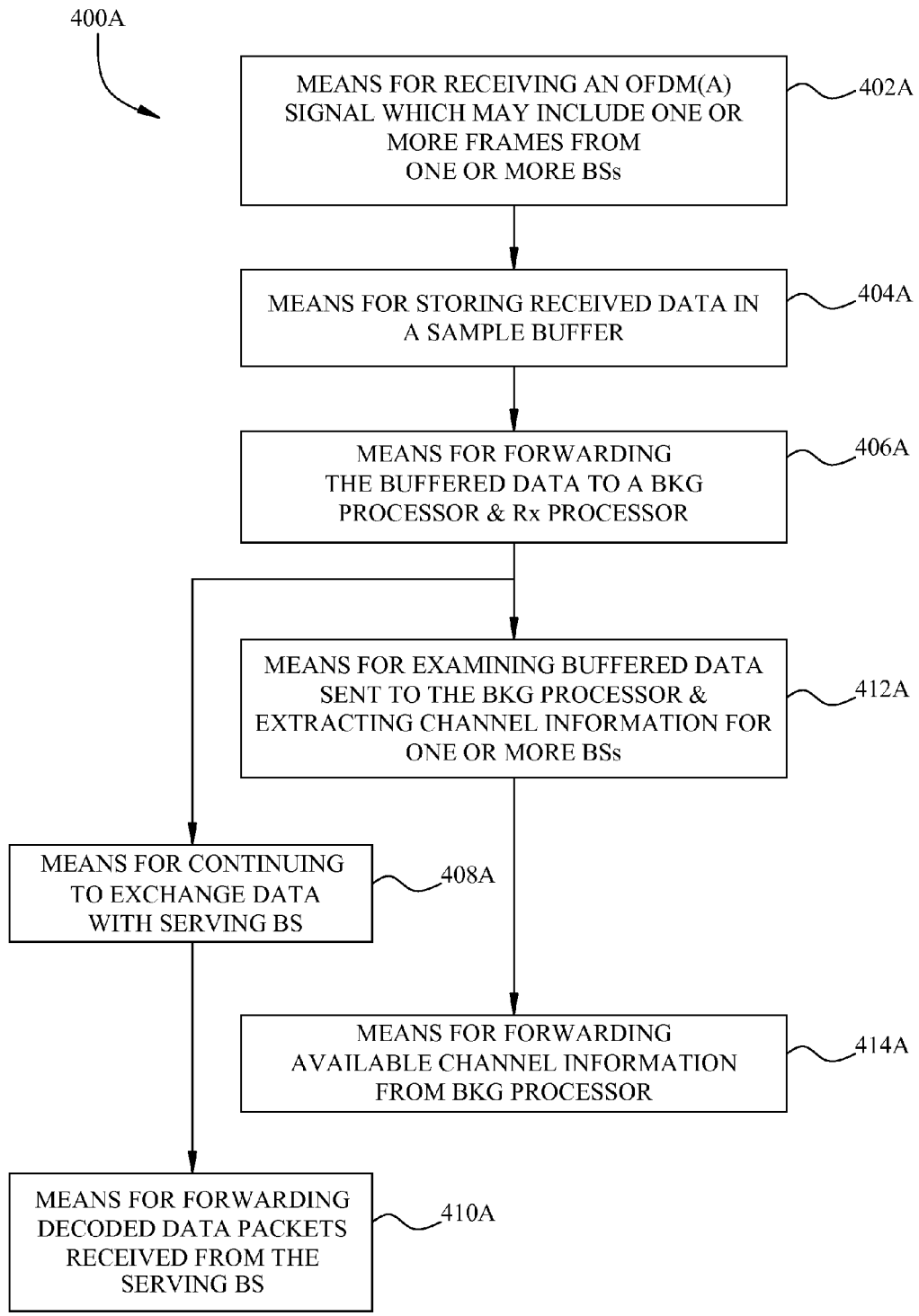
FIG. 4A is a block diagram of means corresponding to the example operations of FIG. 4 for maintaining data throughput while performing neighboring BS scanning, in accordance with embodiments of the present disclosure

The various operations of methods described above may be performed by various hardware and/or software component(s) and/or module(s) corresponding to means-plus-function blocks illustrated in the Figures. Generally, where there are methods illustrated in Figures having corresponding counterpart means-plus-function Figures, the operation blocks correspond to means-plus-function blocks with similar numbering. For example, blocks 402-414 illustrated in FIG. 4 correspond to means-plus-function blocks 402A-414A illustrated in FIG. 4A.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

Information and signals may be represented using any of a variety of different technologies and techniques. For example, data, instructions, commands, information, signals and the like that may be referenced throughout the above description may be represented by voltages, currents, electromagnetic waves, magnetic fields or particles, optical fields or particles or any combination thereof.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in software, the functions may be stored as instructions or as one or more sets of instructions on a computer-readable medium or storage medium. A storage media may be any available media that can be accessed by a computer or by one or more processing devices. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for background scanning in a wireless communication device receiving signals from multiple base stations, comprising:
   buffering raw signal data from multiple base stations in a first sample buffer;
   forwarding the raw signal data to a receive baseband processor for decoding data from a first one of the base stations that is currently designated as a serving base station with an active connection to the wireless communications device;
   forwarding the raw signal data to a background scanning processor, separate from the receive baseband processor;
   employing a second sample buffer to store additional raw signal data received from the multiple base stations in one or more additional frames;
   selecting, using source selection logic at the background scanning processor, a subset of the raw signal data from the first sample buffer or a subset of the additional raw signal data from the second sample buffer;

generating channel characteristics corresponding to the multiple base stations with the background scanning processor based on the subset of the raw signal data or the subset of the additional raw signal data without interrupting the exchange of data with the first base station designated as the serving base station; and wherein the employing the second sample buffer is based in part on determining that a rate of processing the raw data signal at the background scanning processor is below a threshold.

2. The method of claim 1, further comprising:

making a handoff decision to switch from the first base station being designated as the serving station to a second station being designated as the serving station based on the channel characteristics generated by the background scanning processor.

3. The method of claim 2, wherein the handoff decision is made by a handoff mechanism on the wireless communications device separate from the background scanning processor.

4. The method of claim 3, further comprising:

updating, with the background scanning processor, a handoff trigger metric table used by the separate handoff mechanism to determine if a handoff is desirable.

5. The method of claim 2, wherein the handoff decisions is made the background scanning processor.

6. A wireless communications device, comprising:

a sample buffer for buffering raw signal data received from multiple base;

a receive baseband processor for decoding, from the raw signal data, data from a first one of the base stations that is currently designated as a serving base station with an active connection to the wireless communications device;

a sample buffer copy for buffering additional raw signal data received from the multiple base stations in one or more additional frames;

a background scanning processor for selecting, using source selection logic, a subset of the raw signal data from the sample buffer or a subset of the additional raw signal data from the sample buffer copy and generating channel characteristics corresponding to the multiple base stations based on the subset of the raw signal data or the subset of the additional raw signal data without interrupting the exchange of data with the first base station designated as the serving base station; and wherein the background scanning processor employs the sample buffer copy based in part on determining that a rate of processing the raw data signal at the background scanning processor is below a threshold.

7. The wireless communications device of claim 6, further comprising:

a handoff mechanism for making a handoff decision to switch from the first base station being designated as the serving station to a second station being designated as the serving station based on the channel characteristics generated by the background scanning processor.

8. The wireless communications device of claim 7, wherein the handoff mechanism is separate from the background scanning processor.

9. The wireless communications device of claim 8, wherein the background scanning processor is configured to update a handoff trigger metric table used by the handoff mechanism to determine if a handoff is desirable.

10. The wireless communications device of claim 7, wherein the background scanning processor comprises the handoff mechanism.

11. An apparatus for wireless communications, comprising:

means for buffering raw signal data received from multiple base stations in a first sample buffer;

means for decoding, from the raw signal data, data from a first one of the base stations that is currently designated as a serving base station with an active connection to the wireless communications device;

means for employing a second sample buffer to store additional raw signal data received from the multiple base stations in one or more additional frames, selecting a subset of the raw signal data from the first sample buffer or a subset of the additional raw signal data from the second sample buffer, and generating, based on the subset of the raw signal data or the subset of the additional raw signal data, channel characteristics corresponding to the multiple base stations without interrupting the exchange of data with the first base station designated as the serving base station; and wherein the means for employing employs the second sample buffer based in part on determining that a rate of processing the raw data signal is below a threshold.

12. The apparatus of claim 11, further comprising:

means for making a handoff decision to switch from the first base station being designated as the serving station to a second station being designated as the serving station based on the channel characteristics generated by the means for generating.

13. The apparatus of claim 12, wherein the means for making a handoff decision is separate from the means for generating channel characteristics.

14. The apparatus of claim 13, wherein the means for generating channel characteristics is configured to update a handoff trigger metric table used by the separate means for making a handoff decision to determine if a handoff is desirable.

15. A computer-program product for background scanning in a wireless communication device receiving signals from multiple base stations comprising a non-transitory computer readable medium having a set of instructions stored thereon, the set of instructions being executable by one or more processors and the set of instructions comprising:

instructions for receiving raw signal data from multiple base stations;

instructions for storing the raw signal data in a first sample buffer;

instructions for employing a second sample buffer to store additional raw signal data received from the multiple base stations in one or more additional frames;

instructions for selecting, using source selection logic, a subset of the raw signal data from the first sample buffer or a subset of the additional raw signal data from the second sample buffer;

instructions for generating channel characteristics corresponding to the multiple base stations based on the subset of the raw signal data or the subset of the additional raw signal data without interrupting the exchange of data between the wireless communications device and a first one of the base stations designated as a serving base station; and wherein the instructions for employing employ the second sample buffer based in part on determining that a rate of processing the raw data signal is below a threshold.

16. The computer-program product of claim 15, wherein the set of instructions further comprises:
    instructions for making a handoff decision to switch from the first base station being designated as the serving station to a second station being designated as the serving station based on the generated channel characteristics.

17. The computer-program product of claim 15, wherein the set of instructions further comprises:
    instructions for updating a handoff trigger metric table based on the generated channel characteristics.

* * * * *